(12) United States Patent
Zavell et al.

(10) Patent No.: US 6,620,091 B1
(45) Date of Patent: Sep. 16, 2003

(54) UNDERWATER SCRUBBING OF $CO_2$ FROM $CO_2$-CONTAINING HYDROCARBON RESOURCES

(75) Inventors: A. Stephen Zavell, Oakland, CA (US); Dennis J. O'Rear, Petaluma, CA (US); Curtis Munson, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 09/951,552

(22) Filed: Sep. 14, 2001

(51) Int. Cl.[7] .............................................. B01D 47/00
(52) U.S. Cl. ..................... 588/250; 405/129.1; 95/236; 166/367
(58) Field of Search ...................... 588/250; 405/129.35, 405/129.1, 53; 95/226, 236; 166/367, 75.1; 96/329, 351–354

(56) References Cited

U.S. PATENT DOCUMENTS

| | | | |
|---|---|---|---|
| 3,075,918 A | * | 1/1963 | Holm ........................ 507/277 |
| 3,590,919 A | | 7/1971 | Talley, Jr. |
| 4,026,357 A | | 5/1977 | Redford |
| 4,235,607 A | * | 11/1980 | Kinder et al. ................. 95/223 |
| 4,239,510 A | * | 12/1980 | Hays et al. .................... 95/226 |
| 4,241,788 A | | 12/1980 | Brennan |
| 4,444,258 A | | 4/1984 | Kalmar |
| 4,632,601 A | * | 12/1986 | Kuwada ................ 405/129.35 |
| 5,074,357 A | | 12/1991 | Haines |
| 5,154,741 A | | 10/1992 | da Costa Filho |
| 5,261,490 A | * | 11/1993 | Ebinuma .................... 166/266 |
| 5,397,553 A | * | 3/1995 | Spencer ..................... 422/243 |
| 5,454,666 A | * | 10/1995 | Chaback et al. .............. 405/52 |
| 5,566,756 A | * | 10/1996 | Chaback et al. ............ 166/263 |
| 5,660,603 A | | 8/1997 | Elliot et al. |
| 6,149,344 A | * | 11/2000 | Eaton .................... 405/129.28 |
| 6,170,264 B1 | | 1/2001 | Viteri |
| 6,190,301 B1 | | 2/2001 | Murray |

OTHER PUBLICATIONS

E. Dendy Sloan, Jr., "Clathrate Hydrates of Natural Gases," Marcel Dekker, Inc. 1990.
Clifford N. Click, "Applications of Henry's Law to Waste and Process Water VOC Emissions," 85th Annual Meeting Air and Waste Management Association.
Gianni Astartita et al., "Gas Treating with Chemical Solvents," Wiley, p. 208.
John Nighswander et al., "Solubilities of Carbon Dioxide in Water and 1 Wt% NaCL Solution at Pressures up to 10 MPa and Temperatures from 80 to 200 Degrees C," J. Chem. Eng. Data 1989, 34 p. 355–360.
John H. Perry, Chemical Engineering Handbook, Fourth Edition, pp. 9–51, McGraw Hill Book Company, 1963.
International Search Report dated Mar. 11, 2003.

* cited by examiner

Primary Examiner—Heather Shackelford
Assistant Examiner—John Kreck
(74) Attorney, Agent, or Firm—Burns, Doane, Swecker & Mathis, L.L.P.

(57) ABSTRACT

A method for removing $CO_2$ from a $CO_2$-containing hydrocarbon asset. The process includes contacting a $CO_2$-containing hydrocarbon asset with an aqueous liquid stream at an underwater location so that at least a portion of the $CO_2$ in the hydrocarbon asset is dissolved into the aqueous liquid stream, creating a $CO_2$-depleted hydrocarbon asset and a $CO_2$-enriched aqueous stream. The $CO_2$-enriched aqueous stream is separated from the hydrocarbon asset. Finally, the $CO_2$-enriched aqueous stream is disposed of in at least one of a marine environment, a terrestrial formation, or combination thereof.

19 Claims, 2 Drawing Sheets

UNDERWATER SCRUBBING OF CO₂ FROM CO₂-CONTAINING HYDROCARBON RESOURCES

BACKGROUND OF THE INVENTION

1. Field of the Invention

The present invention is directed to producing $CO_2$-depleted hydrocarbons from $CO_2$-rich hydrocarbon resources. In particular, the present invention is directed to underwater scrubbing of $CO_2$-containing hydrocarbon resources with an aqueous stream to produce a $CO_2$-depleted hydrocarbon resource and a $CO_2$-enriched aqueous stream.

2. Description of the Related Art $CO_2$ is a well known environmental pollutant that contributes to atmospheric warming via the Greenhouse effect. $CO_2$ is a common contaminant in hydrocarbon resources such as, for example, natural gas. Generally, only a minimal amount, typically less than about 10 mole %, preferably less than about 5 mole %, of $CO_2$ can be tolerated in a natural gas feed to a synthesis gas generating process. Unfortunately, in instances where $CO_2$-rich hydrocarbon resources have $CO_2$ levels higher than about 10 mole %, no economic method exists for removing the $CO_2$ from the hydrocarbon resources. In addition, when the $CO_2$ is removed, disposal of the $CO_2$ is problematic.

Efforts have been made to dispose of $CO_2$ by injecting it as a compressed gas into underground reservoirs. Also, studies have been done to determine whether $CO_2$ can be disposed of in deep marine environments. However, in existing $CO_2$ disposal methods, $CO_2$ is obtained in a relatively pure state by compressing it and/or condensing it. Thus, a disadvantage of such disposal techniques is that they require costly compressors and/or refrigerators to compress and/or condense $CO_2$.

For example, U.S. Pat. No. 6,190,301, to Murray, describes a process and vehicle for disposal of $CO_2$. In Murray, gaseous $CO_2$ is first solidified and allowed to free fall in a marine environment through open water where it at least partially embeds itself into sedimentary formations. Sedimentation of the $CO_2$ ensures that the marine environment serves as a carbon sink through carbonate sequestration. Accordingly, Murray describes converting gaseous $CO_2$ into a solid, requiring the use of expensive refrigeration and compression processes.

Also, U.S. Pat. No. 6,170,264 to Viteri, describes a low or no pollution engine for delivering power to vehicles or for other power applications. In the engine of Viteri, fuel and oxygen are combusted within a gas generator, generating water and $CO_2$ with carbon-containing fuels. The combustion products, steam, carbon-containing fuels and $CO_2$ are then passed through a condenser where the steam is condensed and the $CO_2$ is collected or discharged. The $CO_2$ is compressed and cooled so that it is in a liquid phase or super critical state. The dense phase $CO_2$ is then further pressurized to a pressure matching a pressure, less hydrostatic head, existing deep within a porous geological formation, a deep aquifer, a deep ocean location or a terrestrial formation from which return of the $CO_2$ into the atmosphere is inhibited. Accordingly, Viteri describes disposing of $CO_2$ from a power generation plant into the ocean or a terrestrial formation, wherein $CO_2$ gas is first compressed and cooled to form a liquid phase which is then further compressed to match the hydrostatic head.

As a result, there is an urgent need for a process and apparatus that can economically remove $CO_2$ from hydrocarbon resources, without having to employ costly compression and/or condensation processes, and that can dispose of the removed $CO_2$ in a manner that isolates the $CO_2$ from the environment.

SUMMARY OF THE INVENTION

The present invention satisfies the above objectives by providing a process that not only economically removes $CO_2$ from hydrocarbon resources, but also disposes of the removed $CO_2$ in a manner that isolates the $CO_2$ from the environment.

The process of the present invention removes $CO_2$ from hydrocarbon resources by contacting a hydrocarbon resource with an aqueous stream, preferably at an elevated pressure. More specifically, processes of the present invention separate $CO_2$ from a hydrocarbon resource by scrubbing the resource with an aqueous stream at elevated pressure, producing a $CO_2$-containing aqueous stream that can be disposed of, for example, in at least one of a marine environment, a terrestrial formation or combination thereof. Thus, one important advantage of the present invention is that it can remove $CO_2$ from hydrocarbon resources without having to use costly compression and/or condensation processes. An additional advantage, is that the present invention can dispose of removed $CO_2$ in an aqueous stream in, for example, a marine environment, a terrestrial formation or combination thereof, thereby effectively isolating the $CO_2$ from the environment.

In particular, a process, according to the present invention, for removing $CO_2$ from a $CO_2$-containing hydrocarbon asset can include contacting the hydrocarbon asset with an aqueous stream at an underwater location so that at least a portion of the $CO_2$ in the hydrocarbon asset is dissolved into the aqueous stream, creating a $CO_2$-depleted hydrocarbon asset and a $CO_2$-enriched aqueous stream. The $CO_2$-enriched aqueous stream is then separated from the hydrocarbon asset. Finally the $CO_2$-enriched aqueous stream is disposed of in at least one of a marine environment, a terrestrial formation or combination thereof.

In addition, a method, according to the present invention, for producing a $CO_2$-depleted hydrocarbon gas from a hydrocarbon/$CO_2$ gas mixture can include contacting a hydrocarbon/$CO_2$ gas mixture underwater with an aqueous stream, so that at least a portion of the $CO_2$ in the gas mixture is dissolved into the aqueous stream, creating a $CO_2$-depleted hydrocarbon gas and a $CO_2$-enriched aqueous stream. Next, the $CO_2$-enriched aqueous stream is separated from the gas stream. Finally, a $CO_2$-depleted hydrocarbon gas is produced.

DETAILED DESCRIPTION OF THE PREFERRED EMBODIMENTS

Figure 1:
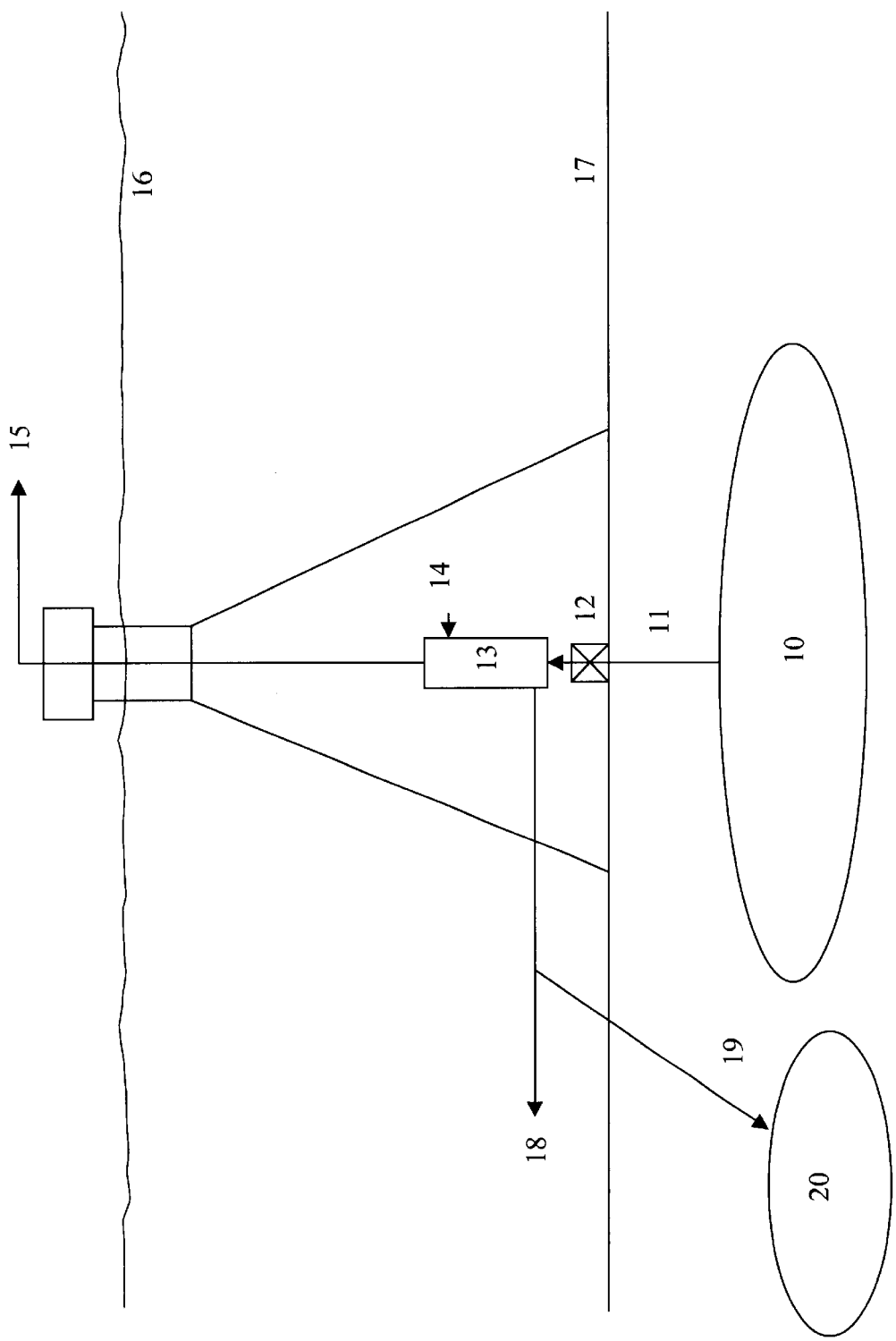
FIG. 1 is a schematic view of a preferred embodiment of a process for producing $CO_2$-depleted hydrocarbons, according to the present invention.

In the present invention, at least a portion of $CO_2$ present in a $CO_2$-containing hydrocarbon is removed by contacting the $CO_2$-containing hydrocarbon with an aqueous stream, preferably at an elevated pressure. Once the $CO_2$ has been removed, a $CO_2$-enriched aqueous stream is generated and is disposed of, for example, in at least one of a marine environment, a terrestrial formation or combination thereof, so that the $CO_2$ is sufficiently isolated from the environment.

Thus, in the present invention, $CO_2$ in a hydrocarbon resource such as, for example, a natural gas, can be removed and then isolated from the environment by scrubbing using an aqueous stream, such as sea water, in an underwater location to produce a $CO_2$-depleted hydrocarbon resource and a $CO_2$-enriched aqueous stream. One important advantage of a process of the present invention is that because it is conducted underwater, it can inexpensively perform scrubbing using sea water as a low cost adsorbent. Another advantage of the present invention is that because the process is conducted underwater, scrubbing can be inexpensively conducted at a pressure greater than about atmospheric pressure, thereby enhancing $CO_2$ dissolution. An additional advantage of the present invention is that because the process is conducted underwater, the process can substantially minimize and/or eliminate the need for costly gas compressors and/or liquid pumps to increase the pressure of an adsorbent used to separate $CO_2$ from a hydrocarbon resource. Yet another advantage of the present invention is that by disposing of the $CO_2$-enriched aqueous stream in at least one of a marine environment, a terrestrial formation or combination thereof, the present invention disposes of removed $CO_2$ in a manner that isolates the $CO_2$ from the environment.

Scrubbing of $CO_2$ from gases using aqueous liquids, according to the present invention, should be conducted at non-extreme pressures to avoid formation of methane, $CO_2$ and other hydrates. The dissolution of $CO_2$ in water is enhanced at elevated pressures. Thus, it is preferable to operate at pressures that are as high as possible. However, to minimize cost, it is preferable to operate at an elevated pressure without employing expensive gas compression processes.

In addition to pressure, temperature and salinity can also be important during processing. For instance, at relatively high temperatures, hydrate formation can occur. Also, at relatively low temperatures, a higher solubility of gas into water and a higher selectivity for removal of $CO_2$ over methane and other valuable hydrocarbons can be achieved. Salinity can also affect the solubility of hydrocarbons in water. For instance, a greater "salting-out" effect can occur on non-ionic hydrocarbons like methane. Accordingly, in processes of the present invention, temperature and salinity of the aqueous stream can be varied to maximize selectivity for $CO_2$ removal. Further, in instances where sea water is used as the aqueous stream, salt in the sea water can exhibit a slight tendency to reduce the temperature at which hydrates form.

It is known in the art that the maximum pressure that can be tolerated to avoid hydrate formation at various temperatures for methane and $CO_2$ are as follows:

| | Pure Methane | | Pure Carbon Dioxide | |
|---|---|---|---|---|
| Temperature | 2° C. | 8° C. | 0° C. | 10° C. |
| Maximum Pressure, Psia | 2.9 MPa (430 psi) | 6.1 MPa (900 psi) | 1.3 Mpa (192 psi) | 14 Mpa (2000 psi) |
| Equivalent Hydrostatic Water Depth, | 1,000 ft | 2,100 ft | 450 ft | 4,800 ft |

-continued

| | Pure Methane | | Pure Carbon Dioxide | |
|---|---|---|---|---|
| Temperature | 2° C. | 8° C. | 0° C. | 10° C. |
| Feed (62.4 lb/ft3 water density) | | | | |

The above data can be found, for example, in E. Dendy Sloan, Jr., "Clathrate Hydrates of Natural Gases," Marcel Dekker, Inc. 1990, the entire disclosure of which is incorporated herein by reference. Sloan also provides numerous examples of gas mixtures and resulting temperatures/pressures at which hydrates form. Suitable operating temperature/pressure combinations are determined on a case by case basis for each gas composition. Sloan describes methods for estimating suitable operating conditions. For instance, for a typical light gas, hydrate formation can be avoided by operating at about 300 psig and about 10° C.

Generally, to avoid hydrate formation, a pressure less than maximum must be used. However, hydrate formation can also be controlled via kinetics and/or heat transfer. Thus, pressure near or above a maximum limit can be used as long as residence time is minimized.

Henry's Law constants for $CO_2$ and $CH_4$ in pure water and sea water, as described, for example, in Clifford N. Click, "Applications of Henry's Law to Waste and Process Water VOC Emissions," 85th Annual Meeting Air and Waste Management Association, are as follows:

| | Methane | | Carbon Dioxide | |
|---|---|---|---|---|
| Temperature | 0° C. | 30° C. | 0° C. | 30° C. |
| Henry's Law Constant in Water (atm/mole fraction) | 22,000 | 42,000 | 740 | 1,850 |
| Henry's Law Constant in Sea Water (estimated) | 40,000 | | 740 | |

Click provides Henry's Law coefficients for several light hydrocarbon gases in water as a function of temperature and also provides an equation for the brine effect. Gianni Astartita, David Savage, and Attilio Bisio, "Gas Treating with Chemical Solvents," Wiley, p. 208, discloses a plot of Henry's Law coefficient physical solubility of $CO_2$ into water as a function of temperature. In addition, John Nighswander, Nicholas Kalogerakis, Anil Mehrotra, "Solubilities of Carbon Dioxide in Water and 1 Wt % NaCl Solution at Pressures up to 10 MPa and Temperatures from 80 to 200 Degrees C.," J. Chem. Eng. Data 1989, 34, p. 355–360, discloses that the effect of salt on $CO_2$ solubility in water over temperatures ranging from 80 to 200° C. and pressures up to 10 MPa is minimal. The disclosures of Sloan, Click, Astartita and Nighswander are incorporated herein by reference in their entireties.

The above data show that using sea water and/or operating at elevated temperatures can enhance the selectivity of $CO_2$ removal. However, in some circumstances using sea water for scrubbing is impractical because of the introduction of sea water contaminants into the gas stream. This can occur, for example, when using sea water to scrub $CO_2$ from a Fischer-Tropsch tail gas stream that is recycled to a Fischer-Tropsch or methane reformer reactor. Generally, the presence of contaminants should not hinder the use of sea water for scrubbing a fuel gas stream from a Fischer-Tropsch process derived from a tail gas.

A preferred embodiment of a process, according to the present invention, for producing $CO_2$-depleted hydrocarbons from $CO_2$-containing hydrocarbons by underwater scrubbing is depicted in FIG. 1. In this embodiment, a $CO_2$-containing hydrocarbon asset stream 11 is provided from a $CO_2$-containing hydrocarbon asset source 10. If necessary, the pressure of the $CO_2$-containing hydrocarbon asset stream 11 is reduced in a pressure reducer 12. The $CO_2$-containing hydrocarbon asset stream 11 then enters a scrubber 13. A stream of sea water 14 enters the scrubber 13. Scrubbing is conducted, producing a $CO_2$-depleted hydrocarbon stream 15 and a $CO_2$-containing sea water stream 18. The $CO_2$-depleted hydrocarbon stream 15 travels above the surface of the water 16 where it is either stored or used for applications including, but not limited to, electric power generation, fuel, syngas generation. The $CO_2$-containing sea water stream 18 is disposed of by being injected into at least one of a marine environment or a $CO_2$ disposal reservoir 20 under the sea bed 17 in a disposal stream 19. An important advantage of this embodiment is that both the sea water used for scrubbing and the hydrocarbon gas asset are at elevated pressures, facilitating dissolution of $CO_2$ into the sea water.

Following separation of the $CO_2$-enriched aqueous stream, the $CO_2$-depleted hydrocarbon asset can be further processed. For example, after separation of the $CO_2$-enriched aqueous stream, the resulting $CO_2$-depleted hydrocarbon asset can be processed using at least one suitable processing step including, but not limited to, compression, condensation, separation of liquids, sulfur removal, dehydration, mercury removal, radon removal, blending with other gas streams, heating, valve adjustment, combinations thereof and the like. Moreover, after separation of the $CO_2$-enriched aqueous stream and/or further processing, the $CO_2$-depleted hydrocarbon asset can be transported to market for use in various applications. For instance, suitable applications for $CO_2$-depleted hydrocarbon assets produced by the present invention include, but are not limited to, electric power generation, furnace fuel, syngas generation, GTL feed stock, methanol feed stock, combinations thereof and the like.

Although the scrubber, depicted in FIG. 1, is positioned between the surface of the water and the sea bed, the scrubber can be at any location under the water including, but not limited to, immediately under the sea level at the production platform, between the production platform and the sea bed, on the sea bed, or even under the sea bed. However, if the hydrocarbon gas asset stream is at a pressure greater than the hydrostatic head at the location of the scrubber, the pressure of the hydrocarbon asset can be reduced to the hydrostatic pressure of the scrubber. If the hydrocarbon gas asset stream is at a pressure greater than the hydrostatic head at the sea bed, the scrubber is preferably positioned on the sea bed and is associated with other production equipment located at this position. Also, if the pressure of the hydrocarbon asset stream is less than the hydrostatic pressure at the sea bed, it is preferable to have the scrubber located at a position above the sea bed where the pressure of the asset matches or exceeds the hydrostatic pressure, rather than being positioned on the sea bed. By positioning the scrubber above the sea bed, the present invention can avoid having to compress the hydrocarbon asset stream to achieve the hydrostatic pressure. If the pressure of the hydrocarbon asset stream is less than the hydrostatic pressure at the sea bed, the scrubber is preferably positioned immediately under the sea level at the production platform and is associated with other production equipment located in this position. Further, in preferred embodiments contacting of the aqueous liquid stream and the hydrocarbon asset is performed at a depth where hydrostatic water pressure is less than or equal to a pressure of a source of the hydrocarbon asset.

Preferably, the temperature of the scrubber is left uncontrolled and remains at ambient conditions. However, under certain situations, it may be preferable to either heat or cool the scrubber to facilitate $CO_2$ removal from the hydrocarbon gas asset stream. For example, if the hydrocarbon gas asset stream includes a viscous liquid, heating may be desirable. In addition, if larger amounts of $CO_2$ are intended to be removed from the hydrocarbon gas asset stream, cooling may be desirable.

The source of the sea water, or alternative aqueous liquid, in processes of the present invention, can either be adjacent to the scrubber or can be positioned some distance away from the scrubber. For example, if cold sea water is desired, and the cold sea water is available at a different location, the cold sea water may be delivered, for example, though a pipe to the scrubber. Preferably, the source of the sea water, or alternative aqueous liquid, is in close proximity to the scrubber. In preferred embodiments, the aqueous liquid source is within about 1 kilometer of the scrubber and more preferably is within about 100 meters of the scrubber.

In processes of the present invention, it is preferable to avoid scrubbing streams that also contain significant amounts of liquid hydrocarbons because the presence of significant amounts of liquid hydrocarbons can make separation of $CO_2$ more difficult. Thus, liquid hydrocarbons present in the $CO_2$-containing hydrocarbon asset stream are preferably separated prior to scrubbing. The separation of liquid hydrocarbons from the $CO_2$-containing hydrocarbon asset stream can also be conducted underwater.

During disposal of the $CO_2$-enriched sea water, or alternative aqueous liquid, stream by at least one of injection into a marine environment, a terrestrial formation, or combinations thereof, the pressure required for injection may be greater than the pressure of the $CO_2$-containing stream exiting the scrubber. In such instances, pressure can be inexpensively increased using liquid phase pumps. In preferred embodiments, a pump used to inject a $CO_2$-enriched aqueous stream into a terrestrial formation is positioned at a depth greater than or equal to a depth of a separator separating the $CO_2$-enriched aqueous stream from a hydrocarbon asset. Ideally, the $CO_2$-containing stream is injected at a pressure and temperature sufficient to ensure that the $CO_2$ does not vaporize, but remains dissolved in the aqueous liquid.

Various terrestrial formations are suitable for the disposal of $CO_2$-enriched aqueous streams. For instance, suitable terrestrial formations include, but are not limited to, hydrocarbonaceous formations, non-hydrocarbonaceous formations, combinations thereof and the like. Particularly suitable terrestrial formations include, but are not limited to, underground natural liquid and gaseous formations, coal beds, methane hydrates, combinations thereof and the like.

There are also numerous marine environments suitable for the disposal of $CO_2$-enriched aqueous streams. For instance, suitable marine environments include, but are not limited to, oceans, seas, lakes, springs, reservoirs, pools, ponds, rivers, combinations thereof and the like.

A marine disposal site for a $CO_2$-enriched aqueous stream need not be near the scrubber, but can be some distance away from the scrubber. For example, if the hydrocarbon production facility is located in shallow water, it may be desirable to dispose of the $CO_2$-enriched aqueous stream in a deep water disposal site some distance away from the production facility. Preferably, the marine disposal site is within about 10 kilometers of the scrubber, more preferably it is within about 1 kilometer of the scrubber and most preferably is within about 100 meters of the scrubber.

Although the $CO_2$-containing hydrocarbon asset source, depicted in FIG. 1, is shown as being positioned underwater, the $CO_2$-containing hydrocarbon asset source does not have to be underwater. For instance, the hydrocarbon asset source can be positioned near a shore line with $CO_2$-containing hydrocarbon assets being pipelined to an offshore location where underwater scrubbing of $CO_2$ is performed. In addition, although it may be preferable to use sea water for scrubbing in processes of the present invention, there are several suitable alternative aqueous liquids that can be used instead of, or in combination with, sea water to scrub $CO_2$ from $CO_2$-containing hydrocarbon assets. Suitable alternative aqueous liquids include, but are not limited to, reaction water formed in a Fischer-Tropsch Gas-To-Liquid (GTL) process, spent cooling water from a Fischer-Tropsch GTL facility, river water or other non potable water and water recovered from crude or gas production.

Ideally, the aqueous stream, preferably sea water, used to scrub $CO_2$ from the $CO_2$-containing hydrocarbon asset has a pH that is as high as possible. Preferably, the pH of the aqueous stream is greater than about 7.0 in order to facilitate scrubbing of $CO_2$. Numerous suitable techniques may be employed to increase the pH of the aqueous stream used to scrub $CO_2$. One suitable way to increase the pH is to add an alkali and/or other basic materials including, but not limited to, ammonia. Further, because the added basic materials are to be disposed of after scrubbing, these materials should be inexpensive and benign to the environment in which they are intended to be disposed. Accordingly, given the economic and environmental constraints, preferred aqueous sources include, but are not limited to, sea water, river water and other non potable water sources.

Fischer-Tropsch GTL process water may be an especially suitable aqueous liquid for $CO_2$-scrubbing because GTL process water is abundantly produced during Fischer-Tropsch GTL processing. For example, the following stoichiometric equation governing the overall conversion of synthesis gas to Fischer-Tropsch products: $nCO + 2nH_2 \rightarrow nH_2O + nCH_2$, wherein $nCH_2$ represents a hydrocarbon product from a Fischer-Tropsch process, demonstrates that the weight ratio of water to hydrocarbon produced during conversion is about 1.25. Thus, a typical Fischer-Tropsch process produces about 25% more water than hydrocarbon, on a weight basis. Unfortunately, a problem with GTL process water is that it may contain acidic contaminants such as, for example, acetic acid. Acidic contaminants can lower the pH of the process water, thereby reducing $CO_2$ solubility. Thus, if GTL process water is used to scrub $CO_2$ from $CO_2$-containing hydrocarbon assets, it is preferable to remove acidic contaminants from the GTL process water prior to using it as a scrubbing stream. Various suitable methods exist for removing acidic contaminants from GTL process water including, but not limited to distillation, adsorption onto alumina or a basic material and oxidation.

If the scrubbing liquid used is not sea water, and contains air, the scrubbing liquid is preferably de-aerated prior to scrubbing. De-aeration of the scrubbing liquid increases a liquid's capacity to adsorb $CO_2$ and minimizes the introduction of air into the $CO_2$-containing hydrocarbon gas stream. Processes for de-aeration of aqueous streams are well known and are used, for example, in desalination plants and for preparation of boiler feed water. Such processes are described in detail, for example, in John H. Perry's Chemical Engineering Handbook, Fourth Edition, pages 9–51, McGraw Hill Book Company, 1963, the entire disclosure of which is incorporated herein by reference.

In certain situations it may be preferable to dispose of the $CO_2$-enriched aqueous stream in the same formation used to supply the $CO_2$-enriched hydrocarbon asset. For instance, it may be preferable to dispose of the $CO_2$-enriched aqueous stream in the same formation from which the hydrocarbon asset is supplied to maintain and/or augment the pressure of the formation. In addition, when pressure maintenance is desirable, it may be beneficial to, at least partially, vaporize the $CO_2$ during injection rather than before or during pumping. $CO_2$ vaporization can be achieved by reducing the pH of the aqueous stream. A suitable way to reduce the pH of the aqueous stream is to inject an acid. In processes of the present invention, acid may be conveniently obtained from acidic waste water produced by a GTL facility. Thus, in a preferred embodiment, a $CO_2$-enriched aqueous stream is injected into a formation not only to dispose of the $CO_2$ removed from the hydrocarbon asset stream, but also to maintain the pressure in the formation. Furthermore, an acidic stream can be injected into the formation to induce $CO_2$ vaporization by reducing the pH of the aqueous stream. Mixing of the acidic stream and the $CO_2$-enriched aqueous stream can be conducted at various suitable locations. However, to minimize problems that may be associated with compression, it is preferable to mix the acidic solution and the $CO_2$-enriched aqueous stream after they have been separately compressed. Mixing can take place in the formation, for example, by using either separate wells or by alternating injection of the streams. Mixing can also be conducted above ground after the liquids have been pressurized.

In addition to maintaining and/or augmenting formation pressure, the injection of an aqueous stream, possibly with an added surfactant, into a terrestrial formation can facilitate hydrocarbon asset recovery and/or production.

If the $CO_2$-enriched hydrocarbon asset stream contains relatively low amounts of $CO_2$, in comparison with other gases, the aqueous stream may not be highly selective to scrubbing $CO_2$. In such instances, it may be preferable to conduct scrubbing in stages. For example, a first selective $CO_2$ scrubbing operation may be conducted followed by a desorption operation to generate a concentrated $CO_2$ gas stream, followed by scrubbing with an aqueous stream. Technology for selective scrubbing of $CO_2$ is well known in the art and typically uses amines.

While operating conditions may vary, in preferred embodiments operating conditions are adjusted to ensure that the hydrocarbon asset is in a gas phase during contact with the aqueous liquid stream. That is, in preferred embodiments, temperature, pressure, pH and contacting duration should be sufficient to ensure that at least about 75%, more preferably at least about 85% and most preferably at least about 90% by weight of the hydrocarbon asset is in a gas phase. In addition, it preferable to adjust and/or set operating conditions during contacting of the hydrocarbon asset and the aqueous liquid stream and/or during separation of the $CO_2$-enriched aqueous stream after contacting, so that the solubility of $CO_2$ relative to methane in the aqueous liquid stream is enhanced. Similarly, it is preferable to set and/or adjust operating conditions such as, for example, pressure, temperature, pH and contacting duration, during contacting and/or separation to minimize methane hydrate formation.

Finally, in preferred embodiments, disposal of a $CO_2$-enriched aqueous stream should be conducted at a depth, pressure, temperature and pH sufficient to ensure that at least about 75%, more preferably at least about 85% and most preferably at least about 90% of the $CO_2$ removed from a hydrocarbon asset remains dissolved in the aqueous stream.

Although there are numerous suitable scrubbers that can be used in the conjunction with the present invention, scrubbers that are capable of operating underwater are preferred. In particular, scrubbers that minimize the use of complex equipment, such as pumps and control valves, may be especially preferred.

Figure 2:
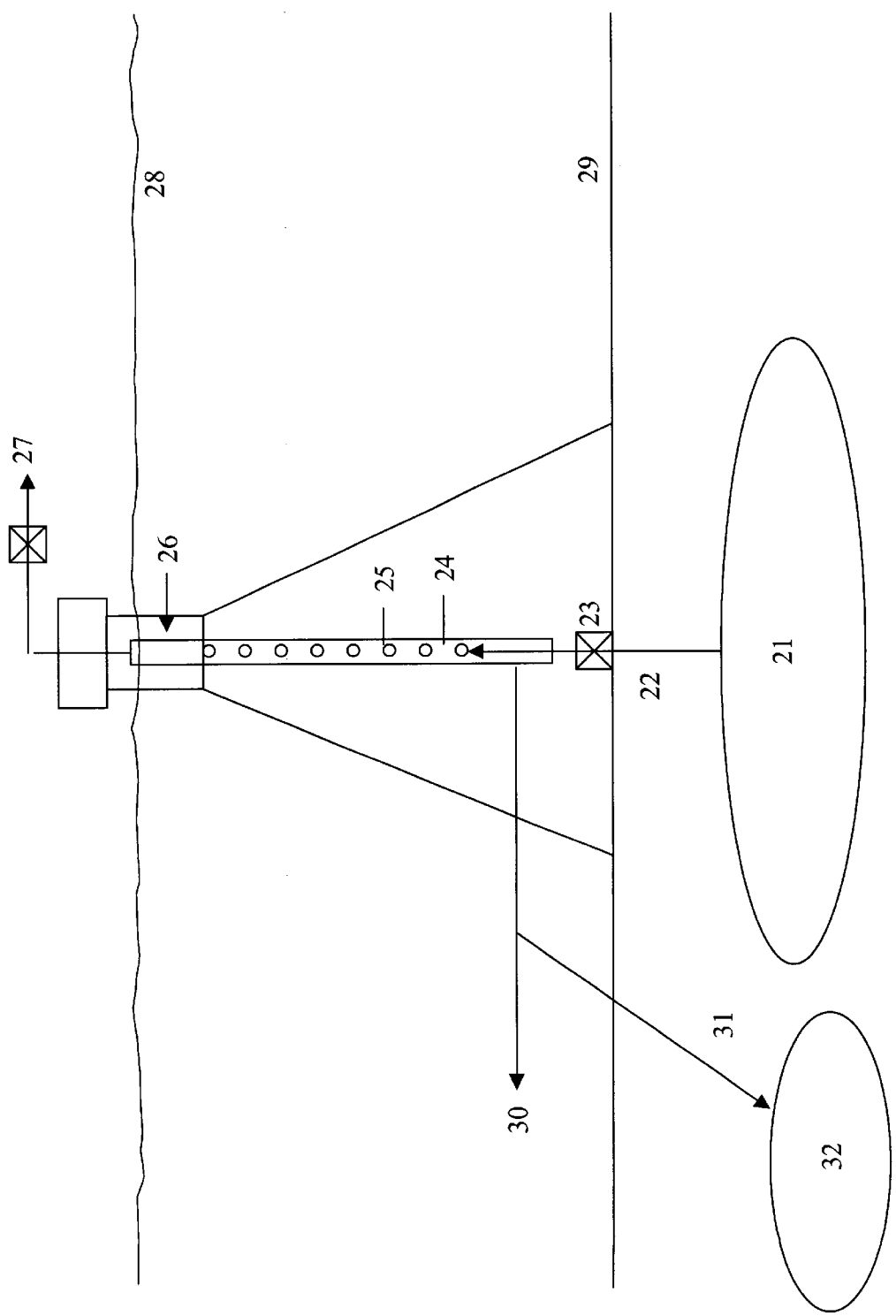
FIG. 2 is a schematic view of another preferred embodiment of a process for producing $CO_2$-depleted hydrocarbons, according to the present invention.

An additional preferred embodiment of the present invention is depicted in FIG. 2. In this embodiment, a $CO_2$-containing hydrocarbon asset stream 22 is provided from a $CO_2$-containing hydrocarbon asset source 21. The $CO_2$-containing hydrocarbon asset stream 22 passes through a pressure reducer 23, that, if necessary, reduces the pressure of the hydrocarbon asset stream 22. The hydrocarbon asset stream 22 then enters a scrubber 24. In this embodiment the scrubber 24 is a long tube filled with slowly downward moving sea water that enters the scrubber 24 in a sea water stream 26. The hydrocarbon asset stream 22, preferably in the form of a gas, is injected into a bottom section of the tube above a discharge point for a $CO_2$-containing sea water exit stream 30. The hydrocarbon asset stream 22, in the form of a gas 25, rises in the tube through sea water and is scrubbed. The pressure of the hydrocarbon asset gas 25 at the top of the tube is maintained at above about atmospheric pressure in order to keep the level of sea water in the tube slightly below the surrounding sea level. The sea water stream 26 is pumped into the tube at a rate sufficient to remove a desired amount of $CO_2$. The pumping rate is adjusted to reach a desired level of $CO_2$ removal. The diameter of the tube is selected so that at a desired sea water pumping rate and hydrocarbon production rate, a downward flow of sea water will not exceed an upward gas bubble velocity. After scrubbing, a $CO_2$-depleted hydrocarbon stream 27 exits the process above the sea level 28. Similarly, after scrubbing, a $CO_2$-containing sea water stream 30 exits the scrubber 24 for at least one of marine disposal and disposal in an underground reservoir 32. If disposed of in an underground reservoir 32, the $CO_2$-containing sea water is directed under the sea bed 29 to the underground $CO_2$ disposal reservoir 32.

EXAMPLES

Example 1

A $CO_2$-rich source of natural gas from an undersea source is obtained with the following molar composition: about 80% $CH_4$, about 20% $CO_2$ and a trace amount of $H_2S$. The gas is scrubbed in a counter-current contactor with de-aerated sea water at about 0° C. or about 30° C. and about 300 psig to remove approximately 90% of the $CO_2$ and to produce a gas with only about 2% $CO_2$. A pressure of about 300 psig is equivalent to a water depth of about 700 feet. The minimum amount of water need per mole of gas along with gas composition and selectivity is as follows:

| Temperature | 0° C. | 30° C. |
|---|---|---|
| Water required, gal/SCF gas (equilibrium limit) | 0.16 | 0.4 |
| Water required, gal/SCF gas (practical) | 0.19 | 0.5 |
| Scrubbing Gas Composition | | |
| Carbon Dioxide | 2 | 2 |
| Methane | 98 | 98 |
| Hydrogen Sulfide | low | low |
| Percent Removal | | |
| Carbon Dioxide | 90 | 90 |
| Methane loss | 3.2% | 4.4% |
| Hydrogen Sulfide | high | high |

The above table provides data for both equilibrium and practical water requirements. The equilibrium value is calculated with equilibrium constants. In practice, some water such as, for example, about 20%, is required to overcome slow transfer that can occur as adsorption approaches equilibrium, and to compensate for slight effects caused by dissolved air if non-de-aerated water is used as the scrubbing fluid.

From the above data, it can be seen that scrubbing can effectively remove $CO_2$ with an acceptable loss of methane. In addition to effectively removing $CO_2$, the above process provides the added benefit of removing hydrogen sulfide. Scrubbing at a relatively low temperature is preferred in order to minimize hydrocarbon loss and water-flow requirements.

While the present invention has been described with reference to specific embodiments, this application is intended to cover those various changes and substitutions that may be made by those of ordinary skill in the art without departing from the spirit and scope of the appended claims.

What is claimed is:

1. A method for removing $CO_2$ from a $CO_2$-containing hydrocarbon asset, the method comprising:

a) contacting a $CO_2$-containing hydrocarbon asset with an aqueous liquid stream at an underwater location so that at least a portion of the $CO_2$ in the hydrocarbon asset is dissolved into the aqueous liquid stream, creating a $CO_2$-depleted hydrocarbon asset and a $CO_2$-enriched aqueous stream, wherein during contact with the aqueous liquid stream, temperature, pressure, pH, and contacting duration are sufficient to ensure that at least about 90% by weight of the hydrocarbon asset is in a gas phase;

b) separating the $CO_2$-enriched aqueous stream from the hydrocarbon asset; and c) disposing of the $CO_2$-enriched aqueous stream in at least one of a marine environment, a terrestrial formation or combination thereof.

2. The method of claim 1, further comprising contacting the hydrocarbon asset with the aqueous liquid stream at an underwater location that is at a depth where hydrostatic water pressure is equal to or less than a pressure of a source supplying the hydrocarbon asset.

3. The method of claim 1, further comprising separating the $CO_2$-enriched aqueous stream from the hydrocarbon asset at an underwater location at a pressure greater than about atmospheric pressure.

4. The method of claim 1, wherein disposal of the $CO_2$-enriched aqueous phase is conducted at a depth, temperature and pH sufficient to ensure that at least about 90% of the $CO_2$ removed from the hydrocarbon asset remains dissolved in the aqueous phase.

5. The method of claim 1, wherein the aqueous liquid is selected from the group consisting essentially of reaction water formed in a Fischer-Tropsch GTL process, spent cooling water from a Fischer-Tropsch GTL facility, river water, other non-potable water sources, water recovered from crude or gas production, sea water and combinations thereof.

6. The method of claim 1, wherein the aqueous stream is comprised of sea water.

7. The method of claim 1, wherein the terrestrial formation is selected from the group consisting essentially of hydrocarbonaceous formations, non-hydrocarbonaceous formations and combinations thereof.

8. The method of claim 1, wherein contacting is performed in a device that employs movement of the aqueous liquid away from a surface of a body of water and movement of the $CO_2$-containing hydrocarbon asset towards the surface of the body of water.

9. A process for producing a $CO_2$-depleted hydrocarbon gas from a hydrocarbon/$CO_2$ gas mixture, the method comprising:
   a) contacting a hydrocarbon/$CO_2$ gas mixture underwater with an aqueous liquid stream so that at least a portion of the $CO_2$ in the gas mixture is dissolved in the aqueous liquid stream, creating a $CO_2$-depleted hydrocarbon gas and a $CO_2$-enriched aqueous stream, wherein during contact with the aqueous liquid stream, temperature, pressure, pH, and contacting duration are sufficient to ensure that at least about 90% by weight of the hydrocarbon/$CO_2$ gas mixture is in a gas phase;
   b) separating the $CO_2$-enriched aqueous stream from the hydrocarbon gas; and
   c) producing a $CO_2$-depleted hydrocarbon gas.

10. The process of claim 9, further comprising processing the $CO_2$-depleted hydrocarbon gas after separation of the $CO_2$-enriched aqueous stream using a processing step selected from the group consisting of compression, condensation, separation of liquids, sulfur removal, dehydration, mercury removal, radon removal, blending with other gas streams, heating, valve adjustment and combinations thereof.

11. The process of claim 9, further comprising disposing of the $CO_2$-enriched aqueous stream at a depth, pressure, temperature and pH sufficient to ensure that at least about 90% of the $CO_2$ removed from the gas mixture remains dissolved in the aqueous liquid stream.

12. The process of claim 9, further comprising disposing of the $CO_2$-enriched aqueous stream in at least one of a marine environment, a terrestrial formation and combinations thereof.

13. The process of claim 12, wherein the terrestrial formation is selected from the group consisting essentially of hydrocarbonaceous formations, non-hydrocarbonaceous formations and combinations thereof.

14. The process of claim 9, wherein the aqueous liquid stream is at least one liquid selected from the group consisting essentially of reaction water formed in a Fischer-Tropsch GTL process, spent cooling water from a Fischer-Tropsch GTL facility, river water, other non-potable water sources, water recovered from crude or gas production, sea water and combinations thereof.

15. The process of claim 9, wherein contact between the gas mixture and the aqueous liquid stream is made at an underwater location at a depth where hydrostatic water pressure is equal to or less than a pressure of a source supplying the gas mixture.

16. The process of claim 9, further comprising separating the $CO_2$-enriched aqueous stream from the hydrocarbon gas at a pressure greater than about atmospheric pressure.

17. The process of claim 9, wherein contacting of the gas mixture and the aqueous liquid stream is conducted using a device wherein the aqueous liquid stream moves in a direction away from a surface of a body of water and wherein the gas mixture moves in a direction towards the surface of the body of water.

18. A method for removing $CO_2$ from a $CO_2$-containing hydrocarbon asset, the method comprising:
   a) at an underwater location, contacting a $CO_2$-containing hydrocarbon asset with an aqueous liquid stream, comprised of sea water and at a pressure greater than about atmospheric pressure, so that at least a portion of the $CO_2$ in the hydrocarbon asset is dissolved into the aqueous liquid stream, creating a $CO_2$-depleted hydrocarbon asset and a $CO_2$-enriched aqueous stream, wherein during contact with the aqueous liquid stream, temperature, pressure, pH, and contacting duration are sufficient to ensure that at least about 90% by weight of the hydrocarbon asset is in a gas phase;
   b) separating the $CO_2$-enriched aqueous stream from the hydrocarbon asset; and
   c) disposing of the $CO_2$-enriched aqueous stream in at least one of a marine environment, a terrestrial formation or combination thereof.

19. A process for producing a $CO_2$-depleted hydrocarbon gas from a hydrocarbon/$CO_2$ gas mixture, the method comprising:
   a) contacting a hydrocarbon/$CO_2$ gas mixture underwater with an aqueous liquid stream, comprising sea water and at a pressure greater than about atmospheric pressure so that at least a portion of the $CO_2$ in the gas mixture is dissolved in the aqueous liquid stream, creating a $CO_2$-depleted hydrocarbon gas and a $CO_2$-enriched aqueous stream, wherein during contact with the aqueous liquid stream, temperature, pressure, pH, and contacting duration are sufficient to ensure that at least about 90% by weight of the hydrocarbon/$CO_2$ gas mixture is in a gas phase;
   b) separating the $CO_2$-enriched aqueous stream from the hydrocarbon gas; and
   c) producing a $CO_2$-depleted hydrocarbon gas.

* * * * *